(12) United States Patent
Miyata

(10) Patent No.: US 9,652,110 B2
(45) Date of Patent: May 16, 2017

(54) RELAYING DEVICE FOR RELAYING IMAGE DATA FROM AN IMAGE PROCESSING DEVICE TO A SERVER

(71) Applicant: BROTHER KOGYO KABUSHIKI KAISHA, Nagoya-shi, Aichi-ken (JP)

(72) Inventor: Yuji Miyata, Kitanagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 226 days.

(21) Appl. No.: 13/940,642

(22) Filed: Jul. 12, 2013

(65) Prior Publication Data
US 2014/0019869 A1    Jan. 16, 2014

(30) Foreign Application Priority Data
Jul. 13, 2012   (JP) ................................. 2012-157724

(51) Int. Cl.
*G06F 3/0481*   (2013.01)
*G06F 17/30*    (2006.01)

(52) U.S. Cl.
CPC ...... *G06F 3/0481* (2013.01); *G06F 17/30905* (2013.01)

(58) Field of Classification Search
None
See application file for complete search history.

(56) References Cited

U.S. PATENT DOCUMENTS

| | | | |
|---|---|---|---|
| 2003/0181199 A1* | 9/2003 | Yamaguchi et al. | 455/414.1 |
| 2005/0231754 A1* | 10/2005 | Uchida | H04N 1/00132 358/1.15 |
| 2006/0085474 A1* | 4/2006 | Tsubono | 707/102 |
| 2012/0084732 A1* | 4/2012 | Filippov | G06F 3/04883 715/838 |

(Continued)

FOREIGN PATENT DOCUMENTS

| | | |
|---|---|---|
| JP | 2001-357225 A | 12/2001 |
| JP | 2005-269250 A | 9/2005 |

OTHER PUBLICATIONS

PrimaDesk http://web.archive.org/web/20110703023728/https://www.primadesk.com/primadesk.html Jul. 3, 2011.*

(Continued)

*Primary Examiner* — Jennifer To
*Assistant Examiner* — Beau Spratt
(74) *Attorney, Agent, or Firm* — Merchant & Gould P.C.

(57) ABSTRACT

The relaying device may generate a first type of image data selection screen data for causing the display unit of the image processing device to display a first type of image data selection screen having a first display pattern, in a case where the folder type information regarding the selected folder indicates that the selected folder is a first type of folder used for storing a first type of image data. The relaying device may generate a second type of image data selection screen data for causing the display unit of the image processing device to display a second type of image data selection screen having a second display pattern which (Continued)

is different from the first display pattern, in a case where the folder type information regarding the selected folder indicates that the selected folder is a second type of folder used for storing a second type of image data.

13 Claims, 8 Drawing Sheets

(56) References Cited

U.S. PATENT DOCUMENTS

2013/0038898 A1* 2/2013 Nuggehalli ........... G06F 3/1222
358/1.15

OTHER PUBLICATIONS

PrimaDesk Fig. 6 https://www.primadesk.com/images/pd/photos_dt.png Jul. 3, 2011.*
PDF Preview for Windows 7, 2012.*
HowToGeek Windows Templates, 2010.*
Lucky-Origami, 2012.*
Smallvoid "Configure automatic detection of folder type" 2007.*

* cited by examiner

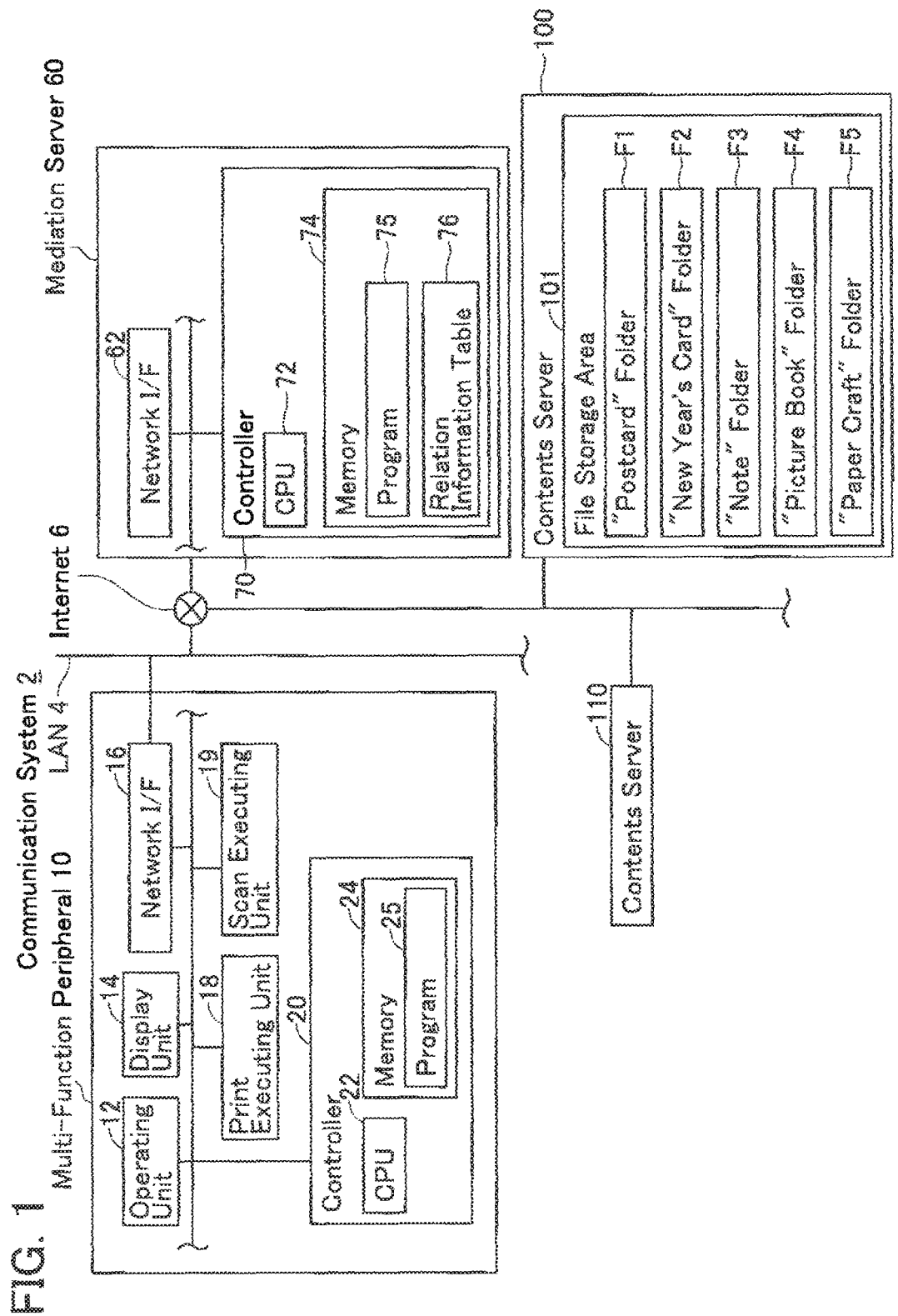

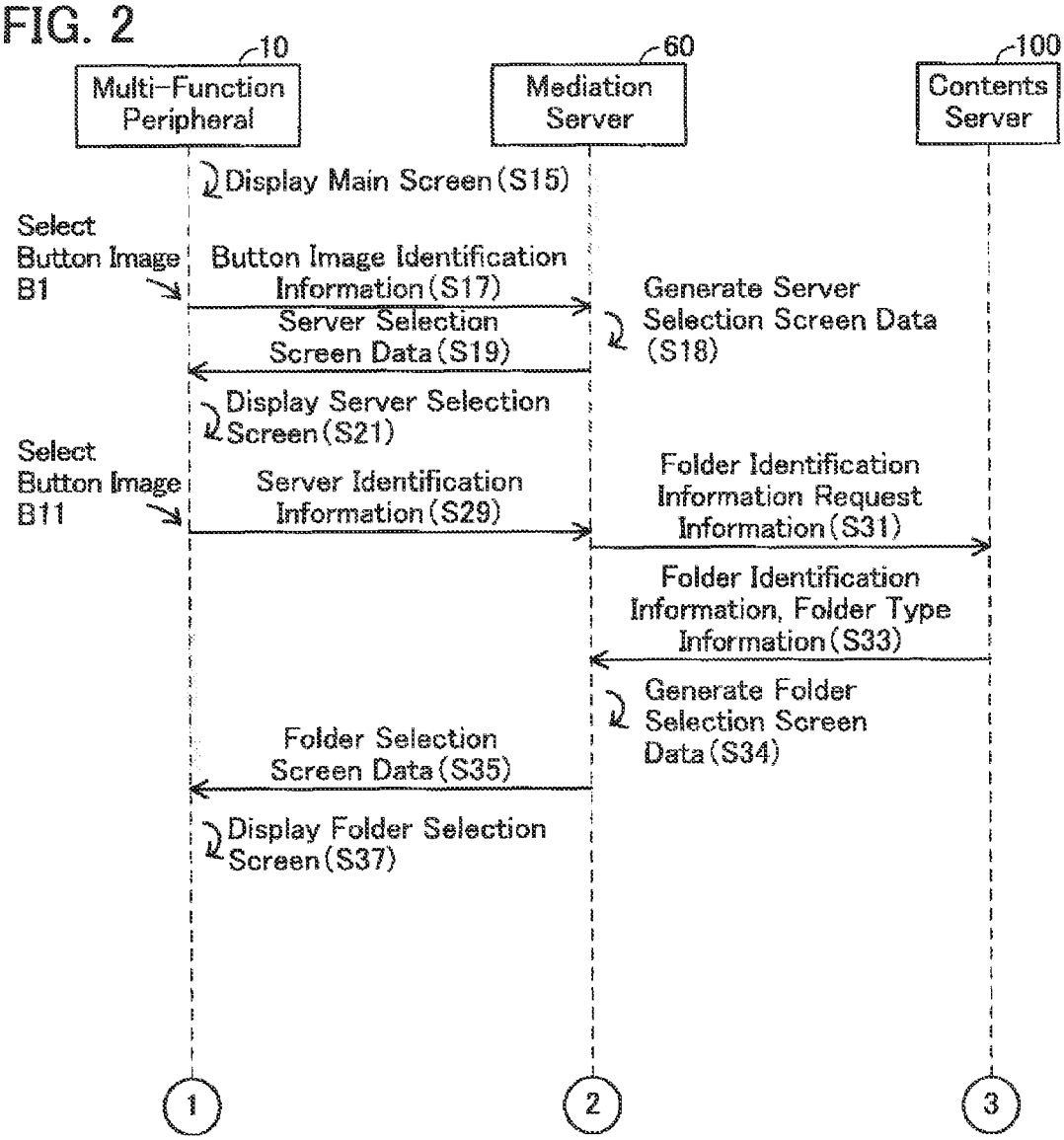

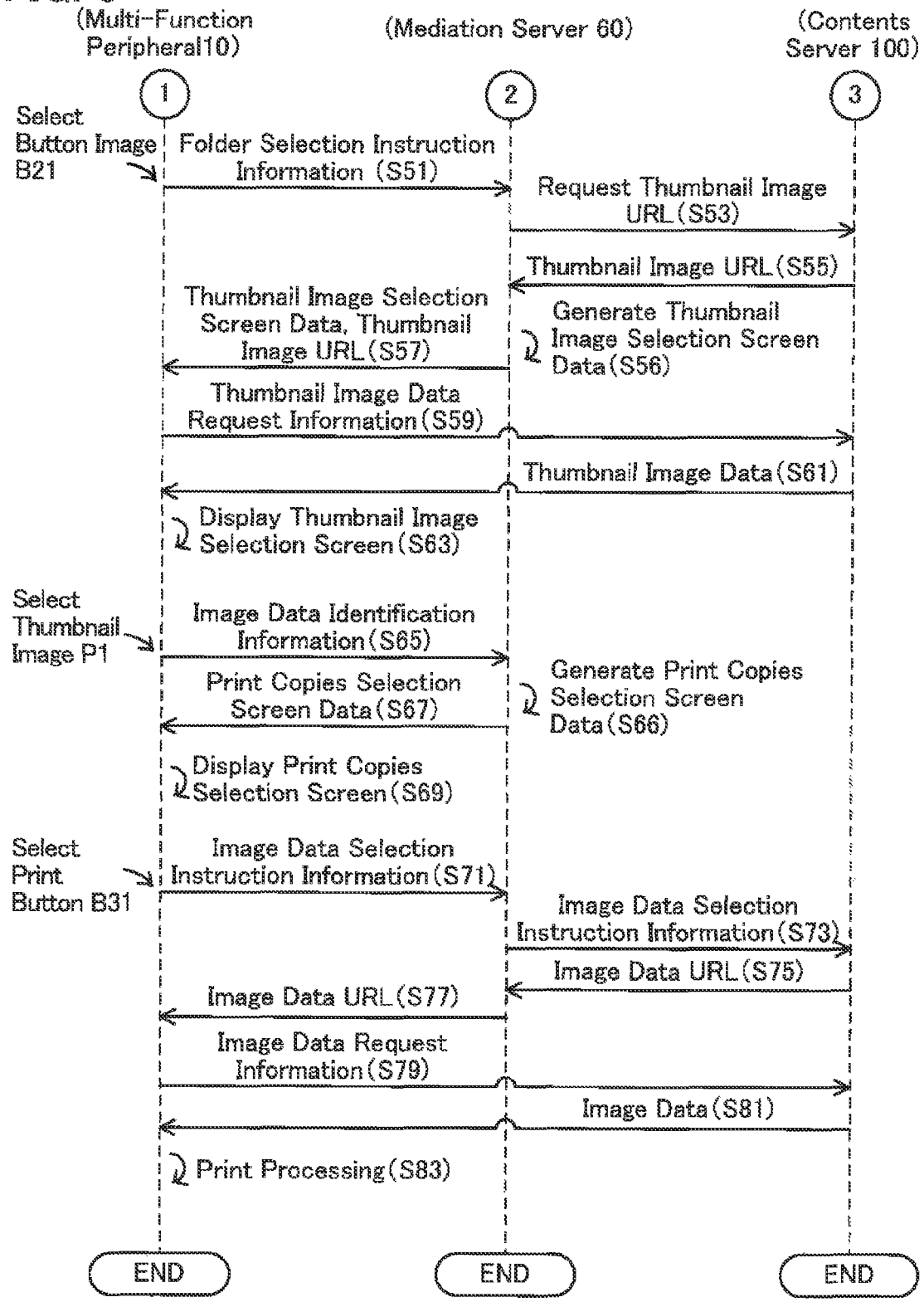

FIG. 4

| Screen Information | Image Information | Relation Information | |
|---|---|---|---|
| Main Screen 201 | Button Image B1 "Internet" | Server Selection Screen 211 | ~R11 |
| | Button Image B2 "Copy" | Copy Screen 212 | |
| | Button Image B3 "Fax" | Fax Screen 213 | |
| | Button Image B4 "Print" | Print Screen 214 | |
| Server Selection Screen 211 | Button Image B11 "Server 100" | Folder Selection Screen 221 | ~R12 |
| | Button Image B12 "Server 110" | Folder Selection Screen 222 | |
| Copy Screen 212 | ... | ... | |
| Fax Screen 213 | ... | ... | |
| Print Screen 214 | ... | ... | |
| Folder Selection Screen 221 | Button Image B21 "Postcard" | Thumbnail Image Selection Screen 231 (Card Type) | ~R13 |
| | Button Image B22 "New Year's Card" | Thumbnail Image Selection Screen 231 (Card Type) | |
| | Button Image B23 "Note" | Thumbnail Image Selection Screen 232 (Book Type) | |
| | Button Image B24 "Picture Book" | Thumbnail Image Selection Screen 232 (Book Type) | ~R15 |
| | Button Image B25 "Paper Craft" | Thumbnail Image Selection Screen 233 (Composite Type) | |
| Thumbnail Image Selection Screen 231 (Card Type) | Thumbnail Image P1 | Print Copies Selection Screen 241 | ~R14 |
| | Thumbnail Image P2 | Print Copies Selection Screen 241 | |
| | Thumbnail Image P3 | Print Copies Selection Screen 241 | |
| Thumbnail Image Selection Screen 232 (Book Type) | Thumbnail Image P11 | Print Page Selection Screen 242 (Book Type) | ~R16 |
| | Thumbnail Image P12 | Print Page Selection Screen 242 (Book Type) | |
| | Thumbnail Image P13 | Print Page Selection Screen 242 (Book Type) | |
| ... | ... | ... | |

RELAYING DEVICE FOR RELAYING IMAGE DATA FROM AN IMAGE PROCESSING DEVICE TO A SERVER

CROSS-REFERENCE TO RELATED APPLICATIONS

This application claims priority to Japanese Patent Application No. 2012-157724, filed on Jul. 13, 2012, the contents of which are hereby incorporated by reference into the present application.

TECHNICAL FIELD

The present specification discloses a relaying device connected with an image processing device and a server via a network.

DESCRIPTION OF RELATED ART

In recent years, an electronic file storing service capable of storing an electronic file in a storage server on a network has been widespread.

SUMMARY

A case in which a desired electronic file is downloaded to an image processing device from an electronic file storage service can be considered. In this case, it is necessary to display a file selection screen on a display unit of the image processing device to allow a user to select an electronic file to be downloaded. Moreover, various types of electronic files such as a file including a plurality of pages or a file including a single page may be present. A mode of displaying the file selection screen displayed on the display unit of the image processing device may not be appropriate depending on the type of the electronic file, which may degrade the user-friendliness.

In one aspect of the teachings disclosed herein, a relaying device configured to communicate with an image processing device and a specific server via a network may be provided. The specific server may be configured to store M pieces of image data (the M being an integer more than 1) having two or more data types in N folders (the N being an integer more than 1). The specific server may be configured to store N pieces of folder type information regarding the N folders. Each of the N pieces of folder type information may be information for indicating which type of image data being to be stored. The relaying device may comprise a processor, a network interface, and a memory. The memory may be configured to store computer-readable instructions therein. The computer-readable instructions, when executed by the processor, may cause the relaying device to perform acquiring, from the specific server via the network interface, the N pieces of folder type information. The computer-readable instructions may cause the relaying device to perform acquiring, from the image processing device via the network interface, folder selection instruction information indicating a selected folder selected from among the N folders. The computer-readable instructions may cause the relaying device to perform acquiring, from the specific server via the network interface, M pieces of image data identification information for identifying the M pieces of image data stored in the specific server. The computer-readable instructions may cause the relaying device to perform generating image data selection screen data for causing a display unit of the image processing device to display an image data selection screen, in a case where the N pieces of folder type information and the M pieces of image data identification information are acquired from the specific server and the folder selection instruction information is acquired from the image processing device. The generating of the image data selection screen data may be executed based on the N pieces of folder type information, the M pieces of image data identification information, and the folder selection instruction information. The image data selection screen may be used for selecting specific image data identification information from among M1 pieces of image data identification information (the M1 being an integer equal to or more than 1 and equal to or less than the M) stored in the selected folder indicated by the folder selection instruction information. The computer-readable instructions may cause the relaying device to perform outputting the generated image data selection screen data so that the network interface sends the image data selection screen data to the image processing device. The computer-readable instructions may cause the relaying device to perform executing a process for causing the image processing device to acquire image data identified by the specific image data identification information acquired from the image processing device that is a destination of the image data selection screen data, in a case where the specific image data identification information is acquired from the image processing device that is the destination of the image data selection screen data after outputting the image data selection screen data to the image processing device. The generating of the image data selection screen data may include generating a first type of image data selection screen data for causing the display unit of the image processing device to display a first type of image data selection screen having a first display pattern, in a case where the folder type information regarding the selected folder indicates that the selected folder is a first type of folder used for storing a first type of image data. The generating of the image data selection screen data may include generating a second type of image data selection screen data for causing the display unit of the image processing device to display a second type of image data selection screen having a second display pattern which is different from the first display pattern, in a case where the folder type information regarding the selected folder indicates that the selected folder is a second type of folder used for storing a second type of image data.

BRIEF DESCRIPTION OF THE DRAWINGS

FIG. 1 shows a configuration of a communication system;

FIG. 2 is a sequence diagram of processing executed by devices in a first case;

FIG. 3 is a sequence diagram of processing executed by devices in a first case;

FIG. 4 shows an example of a relation information table;

EMBODIMENT (System Configuration)

Figure 5:
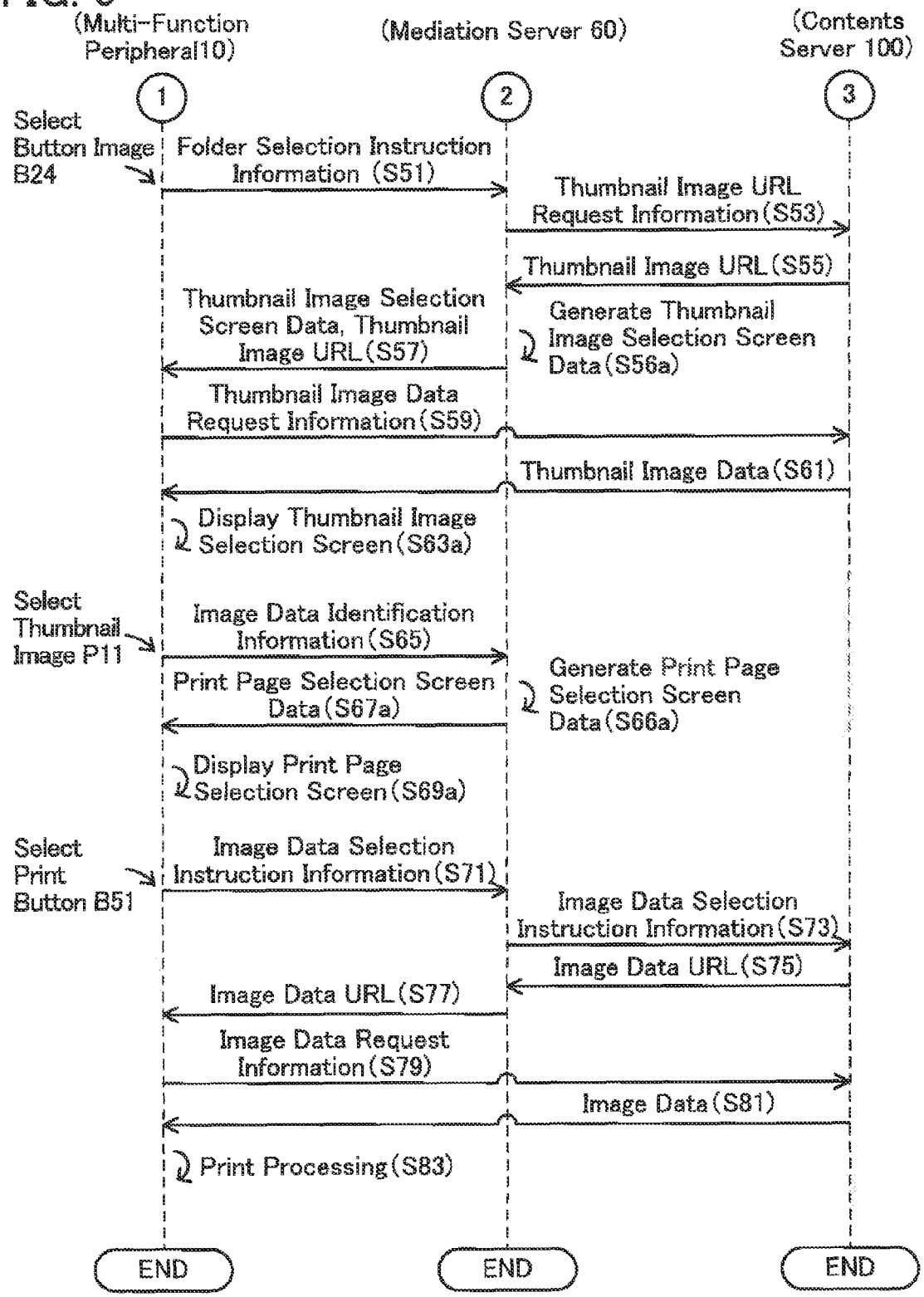
FIG. 5 is a sequence diagram of processing executed by devices in a second case.

As shown in FIG. 1, a communication system 2 includes a multi-function peripheral 10, a mediation server 60, and contents servers 100 and 110. The multi-function peripheral 10 is connected with a LAN 4. The mediation server 60 and the contents servers 100 and 110 are connected with an Internet 6.

(Structure of Multi-Function Peripheral 10)

The multi-function peripheral 10 may execute a Printing function, a Scan function, a Copy function, a FAX function, or the like. The multi-function peripheral 10 comprises an operating unit 12, a display unit 14, a network interface (described as "I/F," hereinafter) 16, a print executing unit 18, a scan executing unit 19, and a controller 20. The operating unit 12 has a plurality of keys. A user can input various instructions to the multi-function peripheral 10 by operating the operating unit 12. The display unit 14 is a display for displaying various pieces of information. The network 16 is connected to the LAN 4. The print executing unit 18 comprises an inkjet or laser printing mechanism. The scan executing unit 19 comprises a scan mechanism such as a CCD or CIS. The controller 20 comprises a CPU 22 and a memory 24. The CPU 22 executes various processes in accordance with program 25 stored in the memory 24.

(Structure of Mediation Server 60)

The mediation server 60 is a server independent of the multi-function peripheral 10 and the contents servers 100 and 110. The mediation server 60 is a server for mediating supply of image data from the contents servers 100 and 110 to the multi-function peripheral 10. The mediation server 60 is a server provided by a vendor of the multi-function peripheral 10. The mediation server 60 includes a network I/F 62 and a controller 70. The controller 70 includes a CPU 72 and a memory 74. A program 75 and a relation information table 76 are stored in the memory 74. The CPU 72 performs various processing in accordance with a program 75 stored in the memory 74.

The relation information table 76 is a table that stores relation information. The relation information is information representing a relation between response information that is sent from the multi-function peripheral 10 to the mediation server 60 and screen data that is sent from the mediation server 60 to the multi-function peripheral 10. FIG. 4 shows an example of the relation information table 76. The relation information table 76 stores screen information 301, image information 302, and relation information 303. The screen information 301 is information that identifies a screen displayed on the display unit 14 of the multi-function peripheral 10. The image information 302 is information that identifies various images included in the screen displayed on the display unit 14. The relation information 303 is information representing screen information that is subsequently displayed on the display unit 14 when any one of various images is selected.

(Structure of Contents Servers 100 and 110)

The contents servers 100 and 110 each are a server used for an online service provided by the vender of the multi-function peripheral 10. The contents servers 100 and 110 are so called storage servers. Note that the contents servers 100 and 110 may be servers used for an online service for lending file storage areas of the respective contents servers 100 and 110 to a user. The online service includes "Evernote (registered trademark)", "Google (registered trademark) Docs", "PICASA (registered trademark), "FACEBOOK (registered trademark)", etc. A user of the online service can upload or download various types of data to or from a storage area assigned to the user via the Internet 6.

The contents server 100 includes a file storage area 101. The file storage area 101 is an area in which various types of data are stored. The file storage area 101 stores a plurality of pieces of image data in a plurality of folders. In the example of FIG. 1, a case where the plurality of pieces of image data are stored in a "Postcard" folder F1, a "New Year's Card" folder F2, a "Note" folder F3, a "Picture Book" folder F4, and a "Paper Craft" folder F5 will be described. The folders F1 to F5 are folders for storing image data of "Postcard," "New Year's Card," "Note," "Picture Book," and "Paper Craft", respectively. The folder is a unit that logically divides the plurality of pieces of image data stored in the file storage area 101. Note that it is not necessary for the plurality of pieces of image data allocated to the same folder to be stored in physically successive storage areas of the file storage area 101. Further, it is, not necessary for the plurality of pieces of image data allocated to the same folder to be stored in the same directory of a file system of the contents server 100. Even if the plurality of pieces of image data allocated to the same folder are stored in different directories of the file system of the contents server 100, when a user-side device of the online service like the multi-function peripheral 10 accesses the contents server 100, the contents server 100 sends information indicating that the plurality of pieces of image data are stored in the same folder to the user-side device.

The type of "Postcard" and "New Year's Card" image data is a card type. A card type folder is a folder for storing image data of a format for reproducing one image. Examples of the image data of the format for reproducing one image include JPEG format image data, EXIF format image data, PNG format image data, BMP format image data, and the like. The type of "Note" and "Picture Book" is a book type. A book type folder is a folder for storing image data of a format for reproducing a plurality of pages of image. Examples of the image data of the format for reproducing a plurality of pages of image include PDF format image data, TIFF format image data, and the like. Further, data of a document file format, created by a document creating application such as Microsoft Word (registered trademark) may be used as book type image data. Furthermore, data of a presentation file format, created by a presentation application such as Microsoft PowerPoint (registered trademark) may be used as book type image data. The type of "Paper Craft" is a composite type. A composite type folder is a folder for storing a plurality of types of image data. Examples of the image data included in the composite type folder include image data of a paper craft which is a solid model crafted from paper and image data of the manual of a paper craft. The "Paper Craft" folder may store image data of a format for reproducing one image as the image data of a paper craft and store image data of a format for reproducing a plurality of pages of image as the image data of the manual of the paper craft. Further, the "Paper Craft" folder may store image data of a format for reproducing a plurality of pages of mage as the image data of a paper craft and store image data of a format for reproducing one image as the image data of the manual of the paper craft. Furthermore, the "Paper Craft" folder may store image data of the same format as the image data of a paper craft and the image data of the manual of the paper craft.

Each folder is correlated with folder type information indicating which type of image data is stored in the folder. An example of the folder type information is the type of image data. The folder type information correlated with the folders F1 and F2 is a card type. The folder type information correlated with the folders F3 and F4 is a book type. The folder type information correlated with the folder F5 is a composite type. The contents server 110 has the same structure as the contents server 100, and description thereof will not be provided.

(Role of Mediation Server 60)

A business operator providing the contents server discloses a dedicated API (abbreviation of Application Program Interface) for requiring a reply of a folder name of a folder stored in the contents server or a file name of image data stored in the contents server. When the multi-function peripheral supports an API of the contents server, the multi-function peripheral can require a reply of information of the contents server. When specification of the API is changed, it becomes necessary to update software of the multi-function peripheral to support the changed API. However, it is painful for the user to update the software of the multi-function peripheral that is already operating. Accordingly, in the embodiment, the mediation server 60 is provided in order that the multi-function peripheral 10 can download data from the contents server even when the multi-function peripheral 10 does not support the API of the contents server. That is, the mediation server 60 supports the API for requiring a reply of a folder name of a folder stored in the contents server or a file name of image data stored in the contents server. Furthermore, there is a case in that a plurality of contents servers of different types is connected to the Internet. Furthermore, the business operator providing each contents server discloses a dedicated API (abbreviation of Application Program Interface) to download data from the contents server. It is necessary for the multi-function peripheral 10 to support APIs of a plurality of contents servers in order to download data from the respective contents servers, so that it is necessary to store a number of programs. However, storage capacity of a memory of the multi-function peripheral 10 is small as compared with a PC, etc.

Accordingly, in the embodiment, the mediation server 60 is provided so that the multi-function peripheral 10 can download data from each of the plurality of contents servers without storing a number of programs in the multi-function peripheral 10. That is, the mediation server 60 supports a plurality of APIs for the plurality of respective contents servers. Then, in a state where the multi-function peripheral 10 downloads data from a specific contents server (for example, the contents server 100) among the plurality of contents servers, the mediation server 60 uses an API for the specific contents server to perform various communications to be described below (for example, communication of each information in S53 and S73 illustrated in FIG. 3) with the specific contents server. Herewith, the multi-function peripheral 10 can download data from the specific contents server even when the multi-function peripheral 10 does not support the API for the specific contents server.

(Operations of Multi-Function Peripheral, Mediation Server, and Contents Server)

(First Case)

Each operation of the multi-function peripheral 10, mediation server 60, and contents server 100 in a first case will be described using sequence diagrams of FIG. 2 and FIG. 3. The sequence diagrams of the first case are diagram showing an operation when a folder correlated with a card type is selected in S51 described later.

Figure 6:
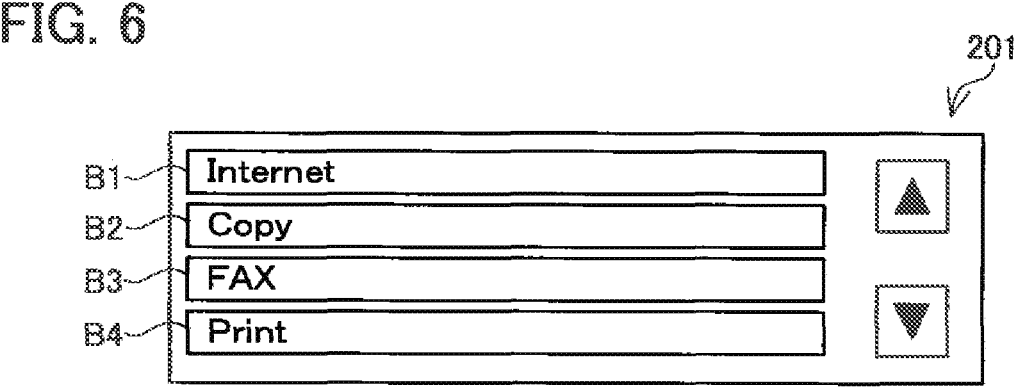
FIG. 6 shows a display example of a main screen.

Upon receiving an order for displaying a main screen, the CPU 22 of the multi-function peripheral 10 cause the display unit 14 to display the main screen in S15. The order for displaying the main screen may be input from the operating unit 12 by a user. Data for displaying the main screen may be preliminarily stored in the memory 24. An example of the main screen 201 is shown in FIG. 6. The main screen 201 includes button images B1 to B4. The button images B1 to B4 are images for receiving an input of an execution order among a plurality of functions. The functions accepted by the button images B1 to B4 are an Internet function, a Copy function, a FAX function, and a Print function, respectively.

In the description example of the present embodiment, a case of downloading image data from the contents server 100 will be described. In this case, the button image B1 included in the main screen 201 is selected. In S17, the CPU 22 of the multi-function peripheral 10 sends button image identification information for identifying the selected button image B1 to the mediation server 60. An example of the button image identification information is "Internet" which is the name of the button image B1.

Upon receiving the button image identification information from the multi-function peripheral 10, the CPU 72 of the mediation server 60 specifies the screen data that is subsequently to be sent to the multi-function peripheral 10 using the relation information table 76. In the description example of the present embodiment, as illustrated in a region R11 of FIG. 4, a server selection screen 211 is specified as relation information 303 corresponding to the button image B1 of the main screen 201. The server selection screen 211 is a screen for allowing the user to select any one of the contents servers 100 and 110.

In S18, the CPU 72 of the mediation server 60 generates server selection screen data for displaying the server selection screen 211. Information (not illustrated) indicating which information needs to be included in the server selection screen data is stored in the memory 74. The CPU 72 of the mediation server 60 generates the server selection screen data according to this information. The server selection screen data includes information indicating that button images B11 and B12 are to be included in the server selection screen 211, information indicating that a screen for selecting any one of the button images B11 and B12 is to be displayed, information indicating that server names "Server 100" and "Service 110" correspond to the button images B11 and B12, respectively, and information indicating character strings to be displayed in association with the button images B11 and B12. In S19, the CPU 72 of the mediation server 60 sends the server selection screen data to the multi-function peripheral 10.

Figure 7:
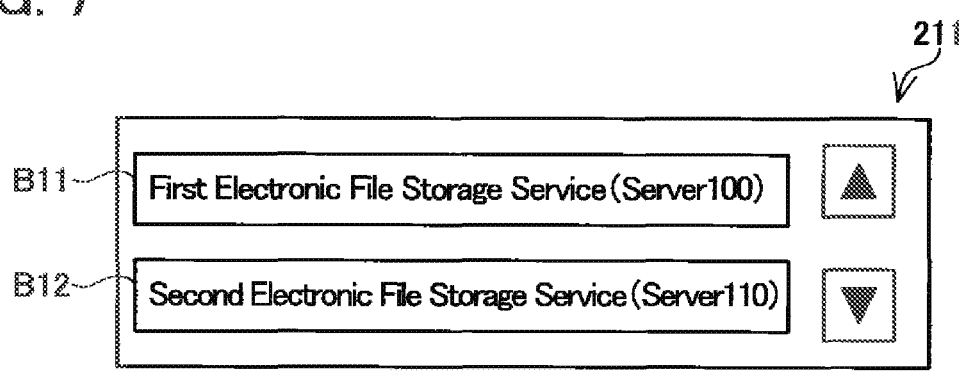
FIG. 7 shows a display example of a server selection screen.

Upon receiving the server selection screen data from the mediation server 60, the CPU 22 of the multi-function peripheral 10 displays the server selection screen 211 on the display unit 14 in S21. As illustrated in FIG. 7, the server selection screen 211 includes the button images B11 and B12. The button images B11 and B12 are images for accepting selection of the contents servers 100 and 110, respectively. The CPU 22 of the multi-function peripheral 10 creates bitmap information or the like for displaying the images of the button images B11 and B12 based on the server selection screen data received from the mediation server 60 and displays the server selection screen 211 on the display unit 14. In this manner, since the bitmap information is created by the multi-function peripheral 10, bitmap information for displaying the images of the button images B11 and B12 does not need to be included in the server selection screen data. Further, bitmap information for displaying the Up and Down arrow buttons illustrated in FIG. 7 does not need to be included in the server selection screen data. The user operates the operating unit 12 to select a button image that represents the contents server, from which image data is to be downloaded, on the server selection screen 211. In the present embodiment, a case where the user selects the button image B11 (that is, the contents server 100) will be described as an example. In S29, the CPU 22 of the multi-function peripheral 10 sends a server name "Server 100" corresponding to the button image B11 selected by the user to the mediation server 60. The server name "Server 100" corresponding to the button image B11 is an example of server identification information.

The CPU 72 of the mediation server 60 specifies screen data that is subsequently to be sent to the multi-function peripheral 10 using the relation information table 76 based on the server identification information transmitted from the multi-function peripheral 10 in S29. In the description example of the present embodiment, as illustrated in a region R12 of FIG. 4, a folder selection screen 221 is specified as relation information 303 corresponding to the server name "Server 100" which is the server identification information. Information (not illustrated) indicating that folder identification information needs to be included in folder selection screen data is included in the memory 74. Further, information (not illustrated), indicating that folder identification information needs to be acquired from the contents server 100 in order to create folder selection screen data, is included in the memory 74. Since the folder identification information needs to be acquired from the contents server 100 to create the folder selection screen data, the CPU 72 of the mediation server 60 sends folder identification information request information to the contents server 100 in S31. The folder identification information request information is information for requesting folder identification information. The folder identification information is information for identifying each of the plurality of folders stored in the selected contents server. An example of the folder identification information is a folder name. Upon receiving the folder identification information request information from the mediation sewer 60, the contents server 100 sends a plurality of pieces of folder identification information and a plurality of pieces of folder type information to the mediation server 60 in S33. The plurality of pieces of folder identification information are the folder names of the folders F1 to F5 stored in the file storage area 101, respectively. The plurality of pieces of folder type information are the types of the folders F1 to F5, respectively.

information (not illustrated), indicating that the received folder type information needs to be reflected in a region of the relation information table 76 corresponding to the folder selection screen 221, is included in the memory 74. The CPU 72 of the server 60 reflects the received plurality of pieces of folder type information in the region of the relation information table 76 corresponding to the folder selection screen 221 according to this information. Specifically, "Button Image B21 "Postcard"", "Button Image B22 "New Year's Card"", and the like are stored in the region of image information 302 corresponding to the folder selection screen 221, and "Thumbnail Image Selection Screen 231 (Card Type)", "Thumbnail Image Selection Screen 232 (Book Type)", and the like are stored in the region of relation information 303 corresponding to the folder selection screen 221. Further, information (not illustrated), indicating that the received folder type information needs to be reflected in a predetermined region (not illustrated) of the memory 74, is included in the memory 74. The CPU 72 of the mediation server 60 reflects the received plurality of pieces of folder type information in a predetermined region (not illustrated) of the memory 74 according to this information.

In S34, the CPU 72 of the mediation server 60 generates folder selection screen data for displaying the folder selection screen 221. The folder selection screen is a screen for allowing the user to select a folder to which image data is to be downloaded. The CPU 72 of the mediation server 60 determines the content displayed on the folder selection screen 221 based on the relation information table 76 in which the plurality of pieces of folder identification information and the plurality of pieces of folder type information received in S33 are reflected and the information stored in a predetermined region (not illustrated) of the memory 74. Then, the CPU 72 generates folder selection screen data. The folder selection screen data includes information indicating that button images B21 to B25 are to be included in the folder selection screen 221, information indicating that a screen for selecting any one of the button images B21 to B25 is to be displayed, information indicating folder names "Postcard" to "Paper Craft" correspond to the button images B21 to B25, respectively, and information indicating character strings to be displayed in association with the button images B21 to B25. In S35, the CPU 72 sends the folder selection screen data to the multi-function peripheral 10.

Figure 8:
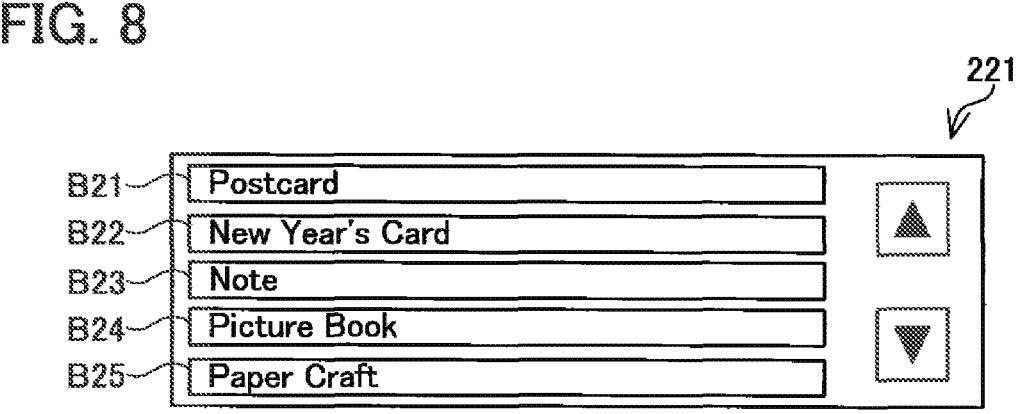
FIG. 8 shows a display example of a folder selection screen.

Upon receiving the folder selection screen data from the mediation server 60, the CPU 22 of the multi-function peripheral 10 displays the folder selection screen 221 on the display unit 14 in S37. As illustrated in FIG. 8, the folder selection screen 221 includes the button images B21 to B25. The button images B21 to B25 are images for accepting selection of the folders F1 to F5, respectively.

The user operates the operating unit 12 to select a button image indicating a folder for accessing data to be downloaded on the folder selection screen 221. In the description example of the first case, a case where the user selects the button image B21 to download "Postcard" will be described as an example.

In S51, the CPU 22 of the multi-function peripheral 10 sends folder selection instruction information to the mediation server 60. The folder selection instruction information is information indicating that one of a plurality of folders is selected. An example of the folder selection instruction information is a folder name.

The CPU 72 of the mediation server 60 specifies screen data that is subsequently to be sent to the multi-function peripheral 10 using the relation information table 76 based on the folder selection instruction information transmitted from the multi-function peripheral 10 in S51. In the description example of the present embodiment, as illustrated in a region R13 of FIG. 4, a card type thumbnail image selection screen 231 is specified as relation information 303 corresponding to the folder name "Postcard" which is folder selection instruction information. Information (not illustrated) indicating that thumbnail image data needs to be included in thumbnail image selection screen data is included in the memory 74. Further, information (not illustrated), indicating that thumbnail image data needs to be acquired from the contents server 100 in order to create thumbnail image selection screen data, is included in the memory 74.

Since the thumbnail image data needs to be acquired from the contents server 100 to create the thumbnail image selection screen data, the CPU 72 of the mediation server 60 sends a thumbnail image URL request information to the contents server 100 in S53. The thumbnail image URL request information is information for requesting thumbnail image URLs for accessing a plurality of pieces of thumbnail image data for reproducing thumbnail images of the plurality of pieces of image data stored in a folder corresponding to the received folder selection instruction information. The thumbnail images are sample images of the images to be reproduced from the plurality of pieces of image data. The thumbnail images are images having a smaller size than the images to be reproduced from the plurality of pieces of image data.

Upon receiving the thumbnail image URL request information from the mediation server 60, the contents server 100 first specifies a selected folder by referring the file storage area 101. The selected folder is a folder specified by the thumbnail image URL request information. Then, the contents server 100 specifies thumbnail image URLs to access thumbnail images of every image data included in the selected folder. In S55, the contents server 100 sends the specified thumbnail image URLs to the mediation server 60. In the illustrative example of the first case, the thumbnail image URLs, for the plurality of pieces of image data included in the "Postcard" folder F1 which is the selected folder, are sent to the mediation server 60.

In S56, the CPU 72 of the mediation server 60 generates thumbnail image selection screen data for displaying a card type thumbnail image selection screen on the display unit 14 of the multi-function peripheral 10. The thumbnail image selection screen data includes information indicating that thumbnail images P1 to P3 and print copies A1 to A3 are to be included in the thumbnail image selection screen 231, information indicating the image data corresponding to the thumbnail images P1 to P3, and information indicating character strings to be displayed in association with the print copies A1 to A3. In S57, the CPU 72 of the mediation server 60 sends the thumbnail image selection screen data and the thumbnail image URLs to the multi-function peripheral 10.

In S59, the CPU 22 of the multi-function peripheral 10 sends thumbnail image data requesting information to the contents server 100 not via the mediation server 60. The thumbnail image data requesting information is information including the thumbnail image URLs. In S61, the contents server 100 sends a plurality of pieces of thumbnail image data specified by the thumbnail image URLs included in the thumbnail image data requesting information to the multi-function peripheral 10 not via the mediation server 60. In this manner, the multi-function peripheral 10 is capable of obtaining the plurality of pieces of thumbnail image data specified by the thumbnail image URLs not via the mediation server 60.

Figure 9:
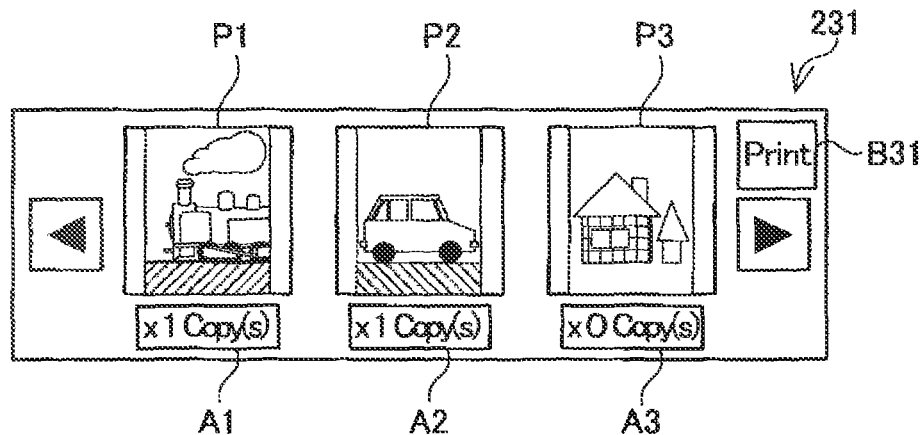
FIG. 9 shows a display example of a card type thumbnail image selection screen.

In S63, the CPU 22 of the multi-function peripheral 10 displays the card type thumbnail image selection screen 231 on the display unit 14 based on the thumbnail image selection screen data received in S57 and the plurality of pieces of thumbnail image data downloaded from the contents server 100 in S61. FIG. 9 shows a display example of the card type thumbnail image selection screen 231. In the display example of FIG. 9, the thumbnail images P1 to P3, the print copies A1 to A3, and a Print button B31 are displayed on the thumbnail image selection screen 231. The thumbnail images P1 to P3 are images for accessing respective pieces of image data stored in the "Postcard" folder F1 which is a selected folder. The print copies A1 to A3 are images indicating how many copies of the images corresponding to the thumbnail images P1 to P3 will be printed. The Print button B31 is an image for accepting the input of a print execution command. Here, the thumbnail image selection screen 231 is displayed in a first mode corresponding to the card type. The first mode is a mode in which the number of copies can be designated for each of the thumbnail images P1 to P3. Moreover, the first mode is a mode in which a plurality of thumbnails from among the thumbnail images P1 to P3 can be selected as a printing target.

The user operates the operating unit 12 to select a thumbnail image on the thumbnail image selection screen 231. In the present embodiment, a case where the thumbnail image P1 is selected by the user will be described as an example. In S65, the CPU 22 of the multi-function peripheral 10 sends the image data identification information of the selected thumbnail image P1 to the mediation server 60.

Upon receiving the image data identification information from the multi-function peripheral 10, the CPU 72 of the mediation server 60 specifies screen data that is subsequently to be sent to the multi-function peripheral 10 using the relation information table 76. In the description example of the present embodiment, as illustrated in a region R14 of FIG. 4, a card type print copies selection screen 241 is specified as a screen corresponding to the thumbnail image P1. The card type print copies selection screen data is screen data for accepting the input regarding how many copies of the image data corresponding to the selected thumbnail image P1 will be printed.

In S66, the CPU 72 of the mediation server 60 generates the card type print copies selection screen data. Information (not illustrated), indicating which information needs to be included in the print copies selection screen data, is stored in the memory 74. The CPU 72 of the mediation server 60 generates the print copies selection screen data according to this information. The print copies selection screen data includes information indicating that button images B41 to B44 are to be included in the print copies selection screen 241 and information indicating that character strings to be displayed in association with the button image B41. In S67, the CPU 72 sends the card type print copies selection screen data to the multi-function peripheral 10.

Figure 10:
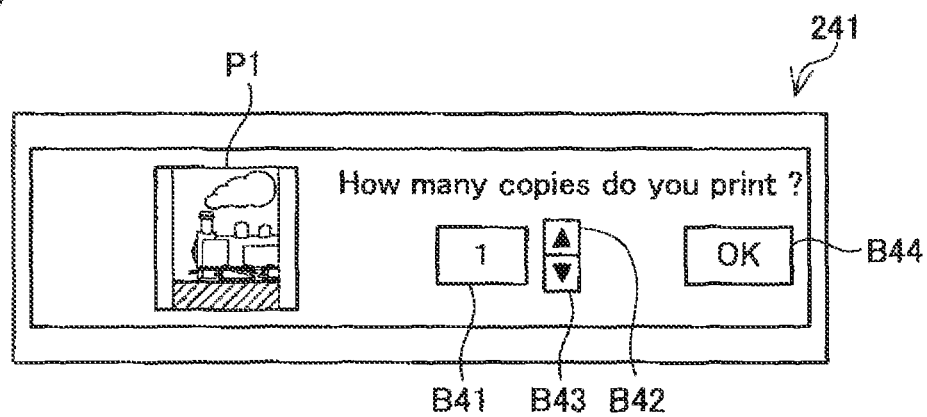
FIG. 10 shows a display example of a card type image data selection screen.

Upon receiving the card type print copies selection screen data from the mediation server 60, the CPU 22 of the multi-function peripheral 10 displays the card type print copies selection screen 241 on the display unit 14 in S69. As illustrated in FIG. 10, the selected thumbnail image P1, a print copies display portion B41, print copies button images B42 and B43, and an OK button B44 are displayed on the card type print copies selection screen 241. By operating the print copies button images B42 and B43, the number of copies of the image data displayed by the thumbnail image P1 can be input to the print copies display portion B41.

In the relation information table 76 in which the plurality of pieces of folder identification information and the plurality of pieces of folder type information received in S33 are reflected, the relation information 303 "Thumbnail Image Selection Screen 231 (Card Type)" is stored in a region (not illustrated) in relation to the image information 302 "OK button B44". The region corresponds to the card type print copies selection screen 241. Information (not illustrated), indicating that the print copies input on the card type print copies selection screen 241 needs to be reflected in order to create the folder selection screen data, is included in the memory 74. Thus, when the OK button B44 is selected, information indicating the print copies input on the card type print copies selection screen 241 is sent from the multi-function peripheral 10 to the mediation server 60. The CPU 72 of the mediation server 60 creates the thumbnail image selection screen data in which the print copies is reflected and sends the created data to the multi-function peripheral 10. The thumbnail image selection screen 231, in which the print copies input on the card type print copies selection screen 241 is reflected, is displayed on the multi-function peripheral 10.

In the relation information table 76, the relation information 303 "Image Data URL" is stored in a region (not illustrated) in relation to the image information 302 "Print Button B31". The region corresponds to the card type thumbnail image selection screen 231. Moreover, information (not illustrated), indicating that the image data URL needs to be acquired from the contents server 100, is included in the memory 74. When the user selects the Print button B31, the CPU 22 of the multi-function peripheral 10 sends image data selection instruction information to the mediation server 60 in S71. The image data selection instruction information is information indicating which image data is selected in the multi-function peripheral 10. Specifically, the image data selection instruction information is information indicating the image data of which one or more copies is selected to be printed according to the input on the thumbnail image selection screen 231 and the card type print copies selection screen 241. The image data selection instruction information may be a file name of the image data corresponding to the selected thumbnail image. In the description example of the first case, as illustrated in FIG. 9, a case where the pieces of image data corresponding to the thumbnail images P1 and P2 are selected as printing targets will be described as an example. Upon receiving the image data selection instruction information from the multi-function peripheral 10, the CPU 72 of the mediation server 60 sends the image data selection instruction information to the contents server 100 in S73.

Upon receiving the image data selection instruction information from the mediation server 60, the contents server 100 sends the image data URL to the mediation server 60 in S75. The image data URL is the URL of the image data corresponding to the file name of the image data included in the image data selection instruction information. In the description example of the first case, the image data URLs of the pieces of image data corresponding to the thumbnail images P1 and P2 are sent to the mediation server 60. Upon receiving the image data URL from the contents server 100, the CPU 72 of the mediation server 60 sends the image data URL to the multi-function peripheral 10 in S77.

Upon receiving the image data URL from the mediation server 60, the CPU 22 of the multi-function peripheral 10 sends image data request information to the contents server 100 without via the mediation server 60 in S79. The image data request information is information including the image data URL. Upon receiving the image data request information from the multi-function peripheral 10, the contents server 100 sends the image data specified by the image data URL included, in the image data request information to the multi-function peripheral 10 without via the mediation server 60 in S81. In the description example of the first case, the pieces of image data corresponding to the thumbnail images P1 and P2 are sent to the multi-function peripheral 10. In this manner, the multi-function peripheral 10 can acquire the image data specified by the image data URL without via the mediation server 60.

Upon downloading the image data from the contents server 100, the CPU 22 of the multi-function peripheral 10 causes the print executing unit 18 to execute printing using the downloaded image data in S83. In the description example of the first case, one copy of each of the images represented by the thumbnail images P1 and P2 is printed.

(Second Case)

Each operation of the multi-function peripheral 10, mediation server 60, and contents server 100 in a second case will be described using the sequence diagram of FIG. 5. The second case is a diagram showing an operation when a folder correlated with a book type is selected in S51. Specifically, a case where the user selects a button image B24 in order to download "Picture Book" on the folder selection screen 221 of FIG. 8 will be described as an example. The operations of S15 to S37 in the second case are the same as the operations of S15 to S37 of FIG. 2 in the first case, and description thereof will not be provided.

In S51 of FIG. 5, the CPU 22 of the multi-function peripheral 10 sends a folder name "Picture Book" to the mediation server 60 as folder selection instruction information. As illustrated in a region R15 of FIG. 4, the CPU 72 of the mediation server 60 specifies a book type thumbnail image selection screen 232 as relation information 303 corresponding to the folder name "Picture Book" which is the folder selection instruction information. In S53, the CPU 72 of the mediation server 60 sends thumbnail image URL request information to the contents server 100. In S55, the contents server 100 sends thumbnail image URLs of the plurality of pieces of image data stored in the "Picture Book" folder F4 which is the selected folder to the mediation server 60.

In S56a, the CPU 72 of the mediation server 60 generates thumbnail image selection screen data for displaying the book type thumbnail image selection screen on the display unit 14 of the multi-function peripheral 10. In S57, the CPU 72 of the mediation server 60 sends the thumbnail image selection screen data and the thumbnail image URLs to the multi-function peripheral 10. In S59, the CPU 22 of the multi-function peripheral 10 sends thumbnail image data request information to the contents server 100. In S61, the contents server 100 sends a plurality of pieces of thumbnail image data specified by the thumbnail image URLs to the multi-function peripheral 10.

Figure 11:
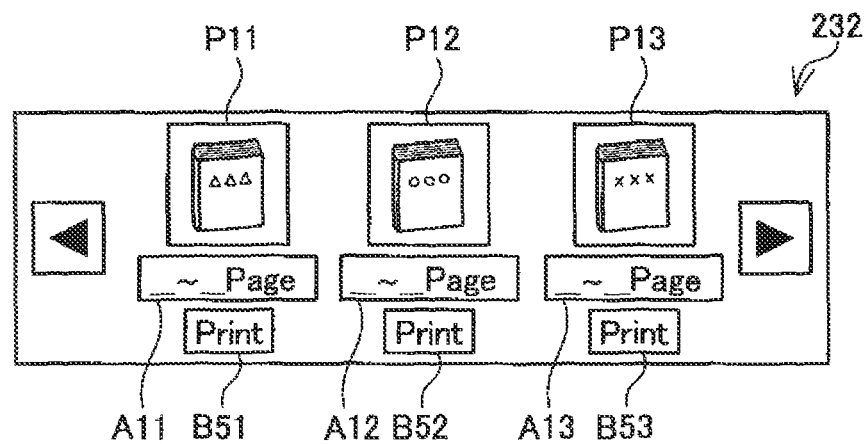
FIG. 11 shows a display example of a book type thumbnail image selection screen.

In S63a, the CPU 22 of the multi-function peripheral 10 displays the book type thumbnail image selection screen 232 on the display unit 14. FIG. 11 shows a display example of the book type thumbnail image selection screen 232. In the display example of FIG. 11, thumbnail images P11 to P13, page designation ranges A11 to A13, and Print buttons B51 to B53 are displayed on the thumbnail image selection screen 232. The thumbnail images Pit to P13 are images for accessing respective pieces of image data stored in the "Picture Book" folder F4 which is the selected folder. The page designation ranges A11 to A13 are images for displaying the ranges of pages to be printed, of the pieces of image data corresponding to the thumbnail images P11 to P13. The Print buttons B51 to B53 are images for accepting the input of a print execution command for the pieces of image data corresponding to the thumbnail images P11 to P13. Here, the thumbnail image selection screen 232 is displayed in a second mode corresponding to the book type. The second mode is a mode in which the pages to be printed can be designated for each of the thumbnail images P11 to P13. Moreover, the second mode is a mode in which only one of the thumbnail images P11 to P13 can be selected as a printing target.

The user operates the operating unit 12 to select one thumbnail image on the thumbnail image selection screen 232. In the present embodiment, a case where the user selects the thumbnail image P11 will be described as an example. In S65, the CPU 22 of the multi-function peripheral 10 sends the image data identification information of the selected thumbnail image P11 to the mediation server 60. In S66a, the CPU 72 of the mediation server 60 generates a book type print page selection screen data. The book type print page selection screen data is screen data for accepting the input regarding which page of the image data corresponding to the selected thumbnail image will be printed. In the description example of the present embodiment, as illustrated in a region R16 of FIG. 4, a book type print page selection screen 242 is specified as a screen corresponding to the thumbnail image P11. In S67a, the CPU 72 sends the book type print page selection screen data to the multi-function peripheral 10.

Figure 12:
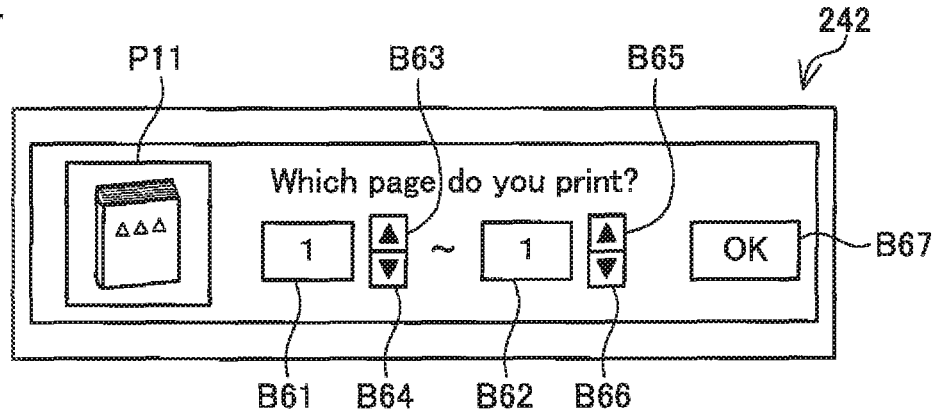
FIG. 12 shows a display example of a book type image data selection screen.

In S69a, the book type print page selection screen 242 is displayed on the display unit 14. As illustrated in FIG. 12, the thumbnail image P11, print page display portions B61 and B62, print page number button images B63 to B66, and an OK button B67 are displayed on the book type print page selection screen 242. By operating the print page number button images B63 to B66, the pages to be printed, of the image data displayed by the thumbnail image P11 can be input to the print page display portions B61 and B62.

In the relation information table 76 in which the plurality of pieces of folder identification information and the plurality of pieces of folder type information received in S33 are reflected, the relation information 303 "Thumbnail Image Selection Screen 232 (Book Type)" is stored in a region (not illustrated) in relation to the image information 302 "OK button B67". The region corresponds to the book type print page selection screen 242. Information (not illustrated), indicating that the print page input on the book type print page selection screen 242 needs to be reflected in order to create the folder selection screen data, is included in the memory 74. Thus, when the OK button B67 is selected, information indicating the print page input on the book type print page selection screen 242 is sent from the multi-function peripheral 10 to the mediation server 60. The CPU 72 of the mediation server 60 creates the thumbnail image selection screen data in which the print page is reflected and sends the created data to the multi-function peripheral 10. The thumbnail image selection screen 232 in which the print page input on the book type print page selection screen 242 is reflected is displayed on the multi-function peripheral 10.

When the user selects the Print button B51, the CPU 22 of the multi-function peripheral 10 sends image data selection instruction information to the mediation server 60 in S71. In the description example of the second case, a file name of the image data corresponding to the thumbnail image P11 is sent to the mediation server 60. The operations subsequent to S73 of FIG. 5 are the same as the operation subsequent to S73 of FIG. 3 in the first case, and description thereof will not be provided.

(Third Case)

In a third case, the content of a screen displayed on the display unit 14 of the multi-function peripheral 10 will be described. The third case is a case where a folder correlated with a composite type is selected in S51. Specifically, a case where the user selects a button image B25 in order to download "Paper Craft" on the folder selection screen 221 of FIG. 8 will be described as an example. The operations of the multi-function peripheral 10, mediation server 60, and contents server 100 in the third case are the same as the operations in the second case. Thus, the description of the respective operations will not be provided.

Figure 13:
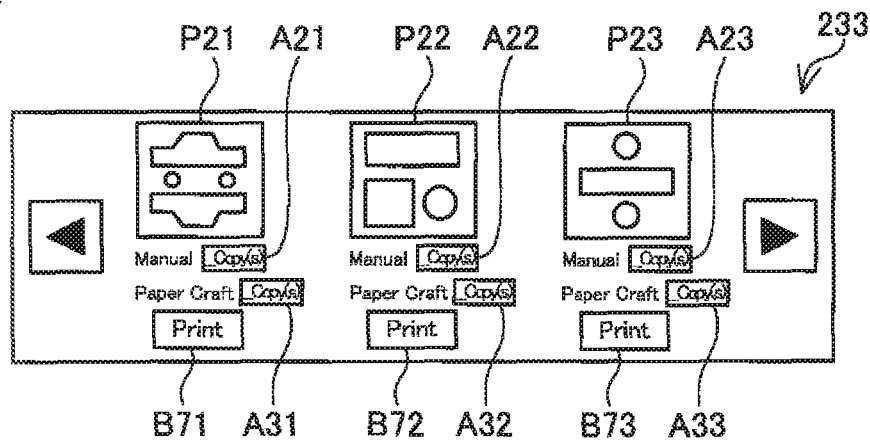
FIG. 13 shows a display example of a composite type thumbnail image selection screen.

In S63 of FIG. 3, the CPU 22 of the multi-function peripheral 10 displays a composite type thumbnail image selection screen 233 on the display unit 14. FIG. 13 shows a display example of the composite type thumbnail image selection screen 233. In the display example of FIG. 13, thumbnail images P21 to P23, print copies A21 to A23 and A31 to A33, and Print buttons B71 to B73 are displayed on the thumbnail image selection screen 233. The thumbnail images P21 to P23 are images for accessing respective pieces of image data stored in the "Paper Craft" folder F5 which is the selected folder. The print copies A21 to A23 are images for displaying print copies of the respective pieces of image data of the manuals corresponding to the thumbnail images P21 to P23, respectively. The print copies A31 to A33 are images for displaying print copies of the respective pieces of image data of the paper crafts corresponding to the thumbnail images P21 to P23, respectively. The Print buttons B71 to B73 are images for accepting the input of a print execution command for the respective pieces of image data corresponding to the thumbnail images P21 to P23. Here, the thumbnail image selection screen 233 is displayed in a third mode corresponding to the composite type. The third mode is a mode in which the number of copes can be designated for each of the manual image data and the paper craft image. Moreover, the third mode is a mode in which only one of the thumbnail images P21 to P23 can be selected as a printing target.

Figure 14:
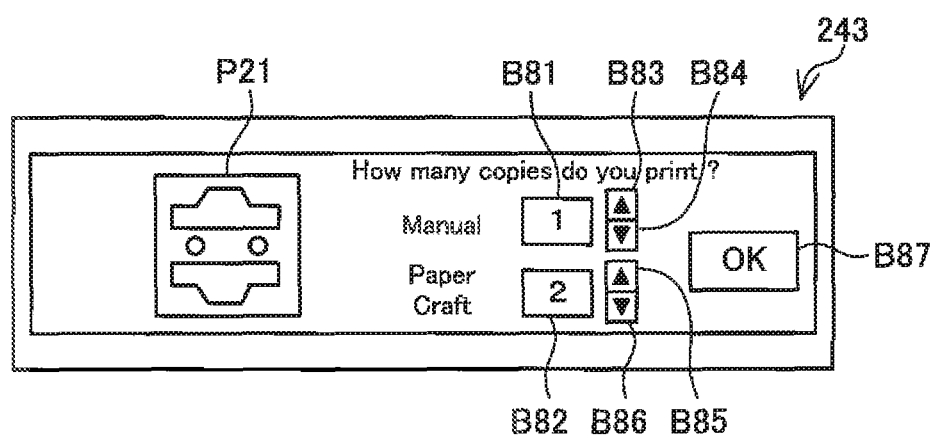
FIG. 14 shows a display example of a composite type image data selection screen.

In S69 of FIG. 3, the CPU 22 of the multi-function peripheral 10 displays a composite type print copies selection screen 243 on the display unit 14. As illustrated in FIG. 14, the selected thumbnail image P21, print copies display portions B81 and B82, print copies button images B83 to B86, and an OK button B87 are displayed on the composite type print copies selection screen 243. By operating the print copies button images B83 and B84, the number of copies of the manual image data can be input to the print copies display portion B81. Moreover, by operating the print copies button images B85 and B86, the number of copies of the paper craft image data can be input to the print copies display portion B82.

(Effects)

In the mediation server 60 disclosed in the present description, a display mode of a thumbnail image selection screen displayed on the display unit 14 of the multi-function peripheral 10 can be changed according to the type of image data stored in the selected folder (S63 and S63a). When card type image data is stored in the selected folder, a card type thumbnail image selection screen (for example, the thumbnail image selection screen 231 of FIG. 9) can be displayed. On the card type thumbnail image selection screen, the number of copies of each piece of the image data can be designated. Moreover, a plurality of pieces of image data can be selected as printing targets. When book type image data is stored in the selected folder, a book type thumbnail image selection screen (for example, the thumbnail image selection screen 232 of FIG. 11) can be displayed. On the book type thumbnail image selection screen, the pages to be printed for each piece of the image data can be designated. Moreover, only one piece of image data can be selected as a printing target. When composite type image data is stored in the selected folder, a composite type thumbnail image selection screen (for example, the thumbnail image selection screen 233 of FIG. 13) can be displayed. On the composite type thumbnail image selection screen, the number of copies for each image data format can be designated. Due to this, since the display mode of the thumbnail image selection screen can be optimized according to the type of image data stored in the selected folder, the user-friendliness can be improved.

Since the card type image data is an image data format for reproducing one image, it may be requested to print a plurality of copies thereof. In the mediation server 60 disclosed in the present description, when card type image data is stored in the selected folder, a card type print copies selection screen (for example, the print copies selection screen 241 of FIG. 10) can be displayed (S69). Due to this, the card type image data can be printed by designating the number of copies thereof.

Since book type image data is an image data format for reproducing a plurality of pages of image, it may be requested to print the image data by designating the pages to be printed. In the mediation server 60 disclosed in the present description, when book type image data is stored in the selected folder, a book type print page selection screen (for example, the print page selection screen 242 of FIG. 12) can be displayed (S69*a*). Due to this, since desired pages of the book type image data can be selectively printed, the user-friendliness can be improved.

Since composite type image data includes pieces of image data having a plurality of types of image data formats, it may be requested to print the image data by designating the number of copies for each image data format. In the mediation server 60 disclosed in the present description, when composite type image data is stored in the selected folder, a composite type print copies selection screen (for example, the print copies selection screen 243 of FIG. 14) can be displayed. Due to this, since the image data can be printed by designating the number of copies for each image data format, the user-friendliness can be improved.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications according to the above embodiments are listed below.

(Modifications)

In S15, a mode of displaying the main screen on the display unit 14 may be various modes. For example, when the user inputs a command for displaying the main screen from the operating unit 12, the multi-function peripheral 10 may access the mediation server 60. The mediation server 60 may create main screen data for displaying the main screen and send the created data to the multi-function peripheral 10. Moreover, the multi-function peripheral 10 may display the main screen based on the main screen data.

In S17, various types of information may be used as the button image identification information for identifying the selected button image. For example, ID information corresponding to the selected button image and an identification number of the selected button image may be used as the button image identification information.

The CPU 22 of the multi-function peripheral 10 receives the server selection screen data (S19), the folder selection screen data (S35), the thumbnail image selection screen data (S57), the print copies selection screen data (S67), and the like from the mediation server 60 and displays various images. Here, a mode may be employed in which these pieces of data include bitmap information for displaying various images. Due to this, since the multi-function peripheral 10 does not need to create the bitmap information, the processing load of the multi-function peripheral 10 can be reduced.

A mode of selecting image data to be downloaded is not limited to the mode of selecting a thumbnail image on the thumbnail image selection screen. For example, a file name selection screen for displaying a list of file names of candidates for image data to be selected. Moreover, the image data corresponding to the selected file name may be designated as the image data to be downloaded.

In S61 or S81, a mode of downloading a plurality of pieces of thumbnail image data and one piece or a plurality of pieces of image data from the contents server to the multi-function peripheral 10 may be various modes. For example, a mode may be employed in which the plurality of pieces of thumbnail image data and one piece or the plurality of pieces of image data are downloaded via the mediation server 60.

In S69, when the OK button B44 is pressed after the number of copies is input on the card type print copies selection screen 241, the input number of copies may be temporarily stored in the memory 24 of the multi-function peripheral 10, and the print copies selection screen 241 may be switched, to the thumbnail image selection screen 231. Moreover, the CPU 22 of the multi-function peripheral 10 may display the stored input number of copies in a print copies display region.

The mediation server 60 may create card type print copies selection screen data when creating thumbnail image selection screen data in S56. Moreover, in S57, the mediation server 60 may send the card type print copies selection screen data together with the thumbnail image selection screen data. In S63, The multi-function peripheral 10 may temporarily store the card type print copies selection screen data in the memory 24 simultaneously with displaying the thumbnail image selection screen on the display unit 14. When a thumbnail image is selected on the thumbnail image selection screen, the multi-function peripheral 10 may display the card type print copies selection screen on the display unit 14 based on the card type print copies selection screen data stored in the memory 24. Due to this, the communication frequency between the multi-function peripheral 10 and the mediation server 60 can be reduced.

A mode of accepting the input of the number of copies may be various modes, and a mode may be adopted in which the print copies selection screen 241 as illustrated in FIG. 10 is not used. For example, a mode may be adopted in which the number of copies is directly input to the print copies display portions A1 to A3 on the thumbnail image selection screen 231 of FIG. 9 using the operating unit 12 or the like.

Although a case in which the book type thumbnail image selection screen 232 illustrated in FIG. 11 is displayed in a mode where the range of pages to be printed can be designated has been described, the present invention is not limited to this mode. The thumbnail image selection screen 232 may be displayed in a mode where the designation of the range of pages to be printed is not accepted.

The mediation server 60 and the contents server 100 may be a united server. Furthermore, in the embodiment, the description is made in which the contents servers 100 and 110 are connected to the Internet 6, but equal to or more than three contents servers may be connected to the Internet 6.

In the embodiment, the case is described in which the CPUs 22 and 72 of the multi-function peripheral 10 and the mediation server 60 execute processing according to software, but is not limited thereto. At least a part of functions provided according to the software may be provided by hardware such as a logic circuit.

The invention claimed is:

1. A relaying device configured to communicate with an image processing device and a specific server via a network,
    the specific server configured to store M pieces of image data having two or more data types in N folders, wherein the M being an integer more than 1 and the N being an integer more than 1, the specific server configured to store N pieces of folder type information regarding the N folders, each of the N pieces of folder type information being information for indicating which type of image data being to be stored, the relaying device comprising:
a processor;
a network interface; and
a memory configured to store computer-readable instructions therein, the computer-readable instructions, when executed by the processor, causing the relaying device to perform:
acquiring, from the specific server via the network interface, the N pieces of folder type information;
acquiring, from the image processing device via the network interface, folder selection instruction information indicating a selected folder selected from among the N folders;
acquiring, from the specific server via the network interface, M pieces of image data identification information for identifying the M pieces of image data stored in the specific server;
generating image data selection screen data for causing a display unit of the image processing device to display an image data selection screen, in a case where the N pieces of folder type information and the M pieces of image data identification information are acquired from the specific server and the folder selection instruction information is acquired from the image processing device,
   the generating of the image data selection screen data being executed based on the N pieces of folder type information, the M pieces of image data identification information, and the folder selection instruction information,
   the image data selection screen being used for selecting specific image data identification information from among M1 pieces of image data identification information stored in the selected folder indicated by the folder selection instruction information, wherein the M1 being an integer equal to or more than 1 and equal to or less than the M;
outputting the generated image data selection screen data so that the network interface sends the image data selection screen data to the image processing device; and
executing a process for causing the image processing device to acquire image data identified by the specific image data identification information acquired from the image processing device that is a destination of the image data selection screen data, in a case where the specific image data identification information is acquired from the image processing device that is the destination of the image data selection screen data after outputting the image data selection screen data to the image processing device,
wherein the generating of the image data selection screen data includes:
   determining whether the folder type information regarding the selected folder indicates: that the selected folder is a first type of folder used for storing a first type of image data; or that the selected folder is a second type of folder used for string a second type of image data,
      the first type of image data being data having a format for reproducing one image and being data not having a page concept, and
      the second type of image data being data having a format for reproducing a plurality of images and being data having a page concept,
   generating a first type of image data selection screen data for causing the display unit of the image processing device to display a first type of image data selection screen having a first display pattern, in a case where determining determines that the selected folder is the first type of folder used for storing the first type of image data that does not have a page concept,
      the first type of image data selection screen including M1 thumbnail images relating to the M1 pieces of image data stored in the selected folder and M1 first images respectively relating to the M1 thumbnail images,
      the M1 first images being images for accepting an instruction for a number of printing copies respectively of the M1 pieces of image data, and
      the M1 thumbnail images included in the first type of image data selection screen being images for accepting a selection of a thumbnail image of a printing target from among the displayed M1 thumbnail images; and
   generating a second type of image data selection screen data for causing the display unit of the image processing device to display a second type of image data selection screen having a second display pattern which is different from the first display pattern, in a case where the determining determines that the selected folder is the second type of folder used for storing the second type of image data that has the page concept,
      the second type of image data selection screen including the M1 thumbnail images and M1 second images respectively relating to the M1 thumbnail images,
      the M1 second images being images for accepting an instruction for designating a range of pages to be printed from among a plurality of pages reproduced from image data respectively relating to the M1 thumbnail images, and
      the M1 thumbnail images included in the second type of image data selection screen being images for accepting a selection of a thumbnail image of a printing target from among the displayed M1 thumbnail images.

2. The relaying device as in claim 1, wherein
the relaying device is configured to communicate with K servers including the specific server via the network, wherein the K being an integer more than 1,
the computer-readable instructions further cause the relaying device to perform:
generating server selection screen data for causing the display unit of the image processing device to display a server selection screen for accepting a selection of specific server identification information from among K pieces of server identification information,
   each of the K pieces of server identification information being information for identifying the K servers;
outputting the server selection screen data generated by the generating of the server selection screen data, so that the network interface sends the server selection screen data to the image processing device;
outputting folder identification information request information so that the network interface sends the folder identification information request information to the specific server that is identified by the specific server identification information, in a case where the specific server identification information is acquired from the image processing device that is the destination of the server selection screen data after outputting the server selection screen data to the image processing device, the folder identification information request information being information for requesting each of N pieces of folder identification information that identifies each of the N folders in the specific server identified by the specific server identification information;

generating folder selection screen data for causing the display unit of the image processing device to display a folder selection screen for accepting a selection of specific folder identification information from among the N pieces of folder identification information, in a case where the N pieces of folder identification information and the N pieces of folder type information are acquired from the specific server after outputting the folder identification information request information to the image processing device, the folder selection screen data being generated based on the N pieces of folder identification information, each of the N pieces of folder identification information being information for identifying each of the N folders in the specific server; and outputting the generated folder selection screen data so that the network interface sends the folder selection screen data to the image processing device, wherein the acquiring of the folder selection instruction information includes acquiring the specific folder identification information as the folder selection instruction information, after outputting the folder selection screen data to the image processing device, the specific folder identification information being selected from among the N pieces of folder identification information that are sent from the image processing device that is a destination of the folder selection screen data.

3. The relaying device as in claim 2, wherein the computer-readable instructions further cause the relaying device to perform:

storing relation information regarding first screen data, response information, and second screen data in memory, the first screen data being data outputted to the image processing device, the response information being information responded from the image processing device after outputting the first screen data, the second screen data being data outputted secondly to the image processing device that is sender of the response information; and outputting the second screen data in accordance with the relation information stored in the memory so that the network interface sends the second screen data to the image processsing device that is sender of the response information, in a case where the response information is acquired from the image processing device that is a destination of the first screen data after outputting the second screen data, wherein the outputting of the second screen data includes:

the outputting of the folder identification information request information;

the generating of the folder selection screen data; and the outputting of the generated folder selection screen data.

4. The relaying device as in claim 1, wherein the generating of the image data selection screen data includes:

generating the first type of image data selection screen data in the case where the folder type information regarding the specific folder indicates that the selected specific folder is the first type of folder, the first type of image data selection screen being a screen for accepting a selection of a thumbnail image from among the display M1 thumbnail images, the first type of folder being a folder for storing the first type of image data having a format for displaying one image; and generating the second type of image data selection screen data in the case where the folder type information indicates that the selected folder is the second type of folder, the second type of image data selection screen data being data for causing the display unit of the image processing device to display the second type of image data selection screen that includes the M1 thumbnail images relating of the M1 pieces of image data stored in the selected folder, the second type of image data selection screen being a screen for accepgint a selection of a thumbnail image from among the displayed M1 thumbnail images, the second type of folder being folder for storing the second type of image data having a format for displaying a plurality of images.

5. The relaying device as in claim 1, wherein the generating of the image data selection screen data includes:

generating a third type of image data selection screen data in a case where the folder type information regarding the specific folder indicates that the selected specific folder is a third type of folder, the third type of folder being folder for storing a third type of image data in which image data having a first image data format and image data having a second image data format are associated, the first image data format being for reproducing one image and being a format not having a page concept, and the second image data format being for reproducing a plurality of images and being a format having a page concept, the third type of image data selection screen data being data for causing the display unit of the image processing device to display a third type of image data selection screen that includes M1 thumbnail images relating to the M1 pieces of image data stored in the selected folder, the third type of image data selection screen being a screen for accepting a selection of a thumbnail image from among the displayed M1 thumbnail images, the third type of image data selection screen being a screen for accepting an instruction for designating at least one of:

a number of printing copies of image data having the first image data format included in the third type of image data relating to the selected thumbnail image; and a number of printing copies of image data having the second image data format included in the third type of image data relating to the selected thumbnail image.

6. The relaying device as in claim 1, wherein
the executing of the process includes outputting specific information so that the network interface sends the specific information to the image processing device,
the specific information being for causing the image processing device to acquire, from the specific server, image data identified by the specific image data identification information acquired from the image processing device that is a destination of the image data selection screen data.

7. The relaying device as in claim 5, wherein
the image data having the second image data format is for causing the display unit of the image processing device to display a manual of an image that is represented by the image data having a first image data format.

8. The relaying device as in claim 6, wherein
the image data having the first image data format is for causing the display unit of the image processing device to display a paper craft which is a solid model crafted from paper.

9. The relaying device as in claim 1, wherein
the first type of image data is at least one of JPEG format image data, EXIF format image data, PNG format image data, and BMP format image data, and
the second type of image data is at least one of PDF format image data, TIFF format image data, data of a document file format created by a document creating application, and data of a presentation file format created by a presentation application.

10. A non-transitory computer-readable storage medium storing a computer program for a relaying device configured to communicate with an image processing device and a specific server via a network,
the specific server configured to store M pieces of image data having two or more data types in N folders, wherein the M being an integer more than 1 and the N being an integer more than 1,
the specific server configured to store N pieces of folder type information regarding the N folders, each of the N pieces of folder type information being information for indicating which type of image data being to be stored,
the relaying device comprising a network interface,
the computer program including instructions for causing a processor of the relaying device to operate as:
acquiring, from the image processing device via the network interface, folder selection instruction information indicating a selected folder selected from among the N folders;
acquiring, from the specific server via the network interface, M pieces of image data identification information for identifying the M pieces of image data stored in the specific server;
generating image data selection screen data for causing a display unit of the image processing device to display an image data selection screen, in a case where the N pieces of folder type information and the M pieces of image data identification information are acquired from the specific server and the folder selection instruction information is acquired from the image processing device,
the generating of the image data selection screen data being executed based on the N pieces of folder type information, the M pieces of image data identification information, and the folder selection instruction information,
the image data selection screen being used for selecting specific image data identification information from among M1 pieces of image data identification information stored in the selected folder indicated by the folder selection instruction information, wherein the M1 being an integer equal to or more than 1 and equal to or less than the M;
outputting the generated image data selection screen data so that the network interface sends the image data selection screen data to the image processing device; and
executing a process for causing the image processing device to acquire image data identified by the specific image data identification information acquired from the image processing device that is a destination of the image data selection screen data, in a case where the specific image data identification information is acquired from the image processing device that is the destination of the image data selection screen data after outputting the image data selection screen data to the image processing device,
wherein the generating of the image data selection screen data includes:
determining whether the folder type information regarding the selected folder indicates that the selected folder is a first type of folder used for storing a first type of image data; or that the selected folder is a second type of folder used for storing a second type of image data,
the first type of image data being data having a format for reproducing one image and being data not having a page concept, and
the second type of image data having a format for reproducing a plurality of images and being data having a page concept
generating a first type of image data selection screen for causing the display unit of the image processing device to display a first type of image data selection screen having a first display pattern, in a case where the determining determines that the selected folder is the first type of folder used for storing the first type of image data that does not have the page concept
the first type of image data selection screen including M1 thumbnail images relating to the M1 pieces of image data stored in the selected folder and M1 first images
respectively relating to the M1 thumbnail images,
the M1 first images being images for accepting an instruction for a number of printing copies respectively of the M1 pieces of image data,
the M1 thumbnail images included in the first type of image data selection screen being images for accepting a selection of a thumbnail image of a printing target from among the displayed thumbnail images; and
generating a second type of image data selection screen data for causing the display unit of the image processing device to display a second type of image data selection screen having a second display pattern which is different from the first display pattern, in a case where the determining determines that the selected folder is the second type of folder used for storing the second type of image data that has the page concept, the second type of image data selection screen including the M1 thumbnail images and M1 second images respectively relating to the M1 thumbnail images relating to the M1 pieces of image data stored in the selected folder, the M1 second images being images for accepting an instruction for designating a range of pages to be printed from among a plurality of pages reproduced from image data respectively relating to the M1 thumbnail images, and the M1 thumbnail images included in the second type of image data selection screen being images for accepting a selection of a thumbnail image of a printing target from among the displayed M1 thumbnail images.

11. The non-transitory computer-readable storage medium as in claim 10, wherein the executing of the process includes outputting specific information so that the network interface sends the specific information to the image processing device, the specific information being for causing the image processing device to acquire, from the specific server, image data identified by the specific image data identification information acquired from the image processing device that is a destination of the image data selection screen data.

12. A method for controlling a relaying device configured to communicate with an image processing device and a specific server via a network, the specific server configured to store M pieces of image data having two or more data types in N folders, wherein the M being an integer more than 1 and the N being an integer more than 1, the specific server configured to store N pieces of folder type information regarding the N folders, each of the N pieces of folder type information being information for indicating which type of image data being to be stored, the relaying device comprising a network interface, the method comprising:

acquiring, from the specific server via the network interface, the N pieces of folder type information;

acquiring, from the image processing device via the network interface, folder selection instruction information indicating a selected folder selected from among the N folders;

acquiring, from the specific server via the network interface, M pieces of image data identification information for identifying the M pieces of image data stored in the specific server;

generating image data selection screen data for causing a display unit of the image processing device to display an image data selection screen, in a case where the N pieces of folder type information and the M pieces of image data identification information are acquired from the specific server and the folder selection instruction information is acquired from the image processing device, the generating of the image data selection screen data being executed based on the N pieces of folder type information, the M pieces of image data identification information, and the folder selection instruction information, the image data selection screen being used for selecting specific image data identification information from among M1 pieces of image data identification information stored in the selected folder indicated by the folder selection instruction information, wherein the M1 being an integer equal to or more than 1 and equal to or less than the M;

outputting the generated image data selection screen data so that the network interface sends the image data selection screen data to the image processing device; and executing a process for causing the image processing device to acquire image data identified by the specific image data identification information acquired from the image processing device that is a destination of the image data selection screen data, in a case where the specific image data identification information is acquired from the image processing device that is the destination of the image data selection screen data after outputting the image data selection screen data to the image processing device, wherein the generating of the image data selection screen data includes:

determining whether the folder type information regarding the selected folder indicates that the selected folder is a first type of folder used for storing a first type of image data: or that the selected folder is a second type of folder used for storing a second type of image data, the first type of image data being data having a format for reproducing one image and being data not having a page concept, and the second type of image data being data having a format for reproducing a plurality of images and being data having a page concept, generating a first type of image data selectin screen data for causing the display unit of the image processing device to display a first type of image data selection screen having a first display pattern, in a case where the determining determines that the selected folder is the first type of folder used for storing the first type of image data that does not have the page concept the first type of image data selection screen including M1 thumbnail images relating to the M1 pieces of image data stored in the selected folder and M1 first images respectively relating to the M1 thumbnail images, the M1 first images being images for accepting an instruction for a number of printing copies respectively of the M1 pieces of image data, the M1 thumbnail images included in the first type of image data selection screen being images for accepting a selection of a thumbnail image of a printing target from among the displayed M1 thumbnail images; and generating a second type of image data selection screen data for causing the display unit of the image processing device to display a second type of image data selection screen having a second display pattern which is different from the first display pattern, in a case where the determining determines that the selected folder is the second type of folder used for storing the second type of image data that has the page concept the second type of image data being data having a format for reproducing a plurality of images and being data having a page concept, the second type of image data selection screen including the M1 thumbnail images and M1 second images respectively relating to the M1 thumbnail images, the M1 second images being images for accepting an instruction for designating a range of pages to be printed from among a plurality of pages reproduced from image data respectively relating to the M1 thumbnail images, and the M1 thumbnail images included in the second type of image data selection screen being images for accepting a selection of a thumbnail image of a printing target from among the displayed M1 thumbnail images.

13. The method as in claim 12, wherein the executing of the process includes outputting specific information so that the network interface sends the specific information to the image processing device, the specific information being for causing the image processing device to acquire, from the specific server, image data identified by the specific image data identification information acquired from the image processing device that is a destination of the image data selection screen data.

* * * * *

UNITED STATES PATENT AND TRADEMARK OFFICE
CERTIFICATE OF CORRECTION

PATENT NO. : 9,652,110 B2
APPLICATION NO. : 13/940642
DATED : July 22, 2014
INVENTOR(S) : Yuji Miyata Page 1 of 1

It is certified that error appears in the above-identified patent and that said Letters Patent is hereby corrected as shown below:

In the Claims

Claim 4
Column 20, Line 27: Delete "accepgint" and insert -- accepting -- therefor.

Claim 12
Column 24, Line 34: Delete "selectin" and insert -- selection -- therefor.

Signed and Sealed this
Twelfth Day of June, 2018

Andrei Iancu
*Director of the United States Patent and Trademark Office*